May 4, 1937.  W. A. ROEHM  2,079,564
SPRAYING DEVICE
Filed March 20, 1936
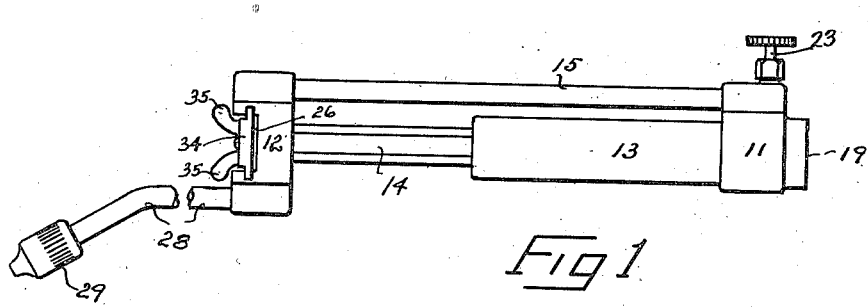
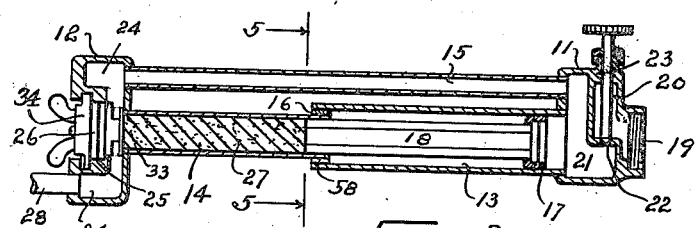
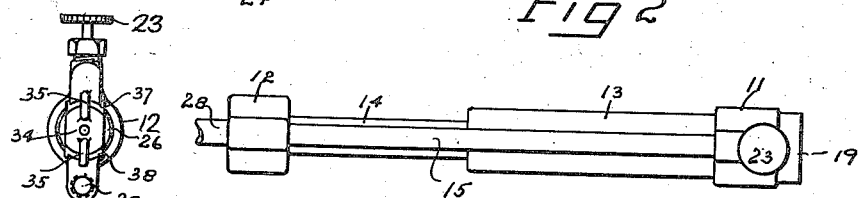
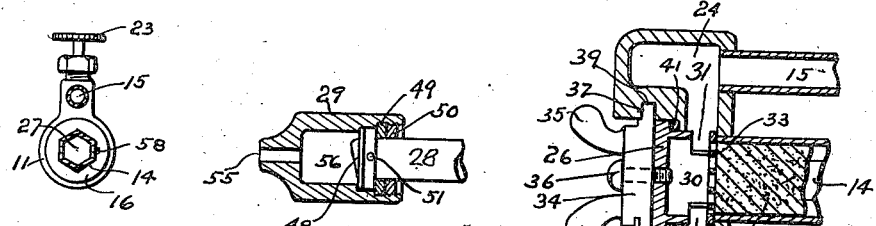
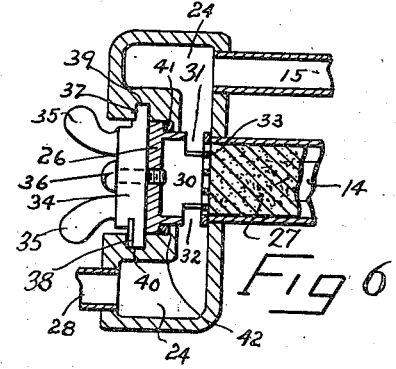
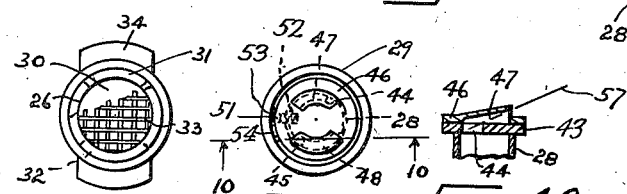
INVENTOR.
William A. Roehm,
BY
ATTORNEYS.

UNITED STATES PATENT OFFICE 2,079,564

SPRAYING DEVICE

William A. Roehm, Lynbrook, N. Y., assignor to Andrew J. Noe and Henry Lerch, Jr., both of Richmond Hill, N. Y.

Application March 20, 1936, Serial No. 69,774

6 Claims. (Cl. 299—85)

The invention relates to spraying devices and more particularly to devices of this type in which the insecticide or other chemical used is mixed with the water right in the device itself. It has for one of its main objects to provide a device in which the mixture of the water and the chemical employed will be absolutely uniform as long as any chemical is left in the device. Another object is to provide means whereby all danger of undissolved particles of the insecticide being discharged from the device is removed. A further object is to provide means which will plainly indicate when the chemical used in the device is exhausted. A still further object is to provide a device which may be actuated by the ordinary water pressure.

Additional objects are to provide a device of simple, effective construction which has no parts easily broken or apt to get out of order, which may be adjusted to various operations, which is easy to manipulate, in which various chemicals may be employed, and which can be manufactured at a comparatively low cost.

These and various other objects and advantages will be readily understood from the following description and from the accompanying drawing of a preferred embodiment of the invention, in which, however, modifications may be made without departing from the scope of the appended claims. In the drawing Fig. 1 is a side elevation of the spraying device;

Fig. 2 a cross-sectional side view;

Fig. 3 a top view;

Fig. 4 a front view;

Fig. 5 a cross-sectional end view, taken on line 5—5 in Fig. 2;

Fig. 6 a fragmental cross-sectional view showing certain details of construction;

Fig. 7 an end view of a certain part employed in the device;

Fig. 8 a cross-sectional side view of the nozzle; and

Figs. 9 and 10 details of certain parts employed in the nozzle.

Referring now to all the views, simultaneously, the device consists of a rear header 11 and a front header 12 which are connected by means of a relatively large cylinder 13, in the outer end of which a small cylinder 14 is secured, and by a by-pass pipe 15. A small cylinder is preferably of hexagonal or other polygonal cross-section and it is secured in the larger cylinder 13 by means of a filler 16. A piston packing 17 is secured on the end of a plunger 18. This plunger is of the same cross-section as the cylinder 14 and adapted to slide comparatively freely in the cylinder. The rear end of the header 11 is threaded as shown at 19 and adapted to receive a hose which may be connected to any water supply under pressure. The rear header consists of two chambers 20 and 21 connected by means of an orifice 22 which may be closed by means of a valve 23. The front header has a single chamber 24 and a large central opening 25 in which a plug 26 is inserted.

The insecticide which is used in the device is molded to fit slidingly in the cylinder 14, as shown at 27. It is preferably made of a relatively soft base, such as soap, in which the insecticide, or other chemical employed, is dissolved. It is inserted in the cylinder 14 through the opening 25 and abuts against the outer end of the plunger 18. A pipe 28 leads from the forward header to the nozzle 29, the construction of which will be described later.

The plug 26, which is shown in detail in Figs. 6 and 7, is provided with a central chamber 30 and with passages 31 and 32. A screen 33 is secured to the inner end of the plug and fits over the end of the cylinder 14. The insecticide cartridge is held between this screen and the front end of the plunger 18. To secure the plug in the header a clamping plate 34, having a finger grip 35, is employed. This clamping plate is secured to the plug by means of a screw 36 and has two wedge-shaped surfaces 37 and 38 which engage in slots 39 and 40 formed in the front of the header. A gasket 41 clamps the plug against the seat 42.

Reference is now particularly made to Figs. 8, 9 and 10 which illustrate the construction of the nozzle 29. A disc 43 closes the outer end of the pipe 28 except for two holes 44 and 45 which are provided in this disc. Another disc 46 fits over the disc 43 and is provided with two arcuated and outwardly slanting orifices 47 and 48. The disc 46 is secured in the nozzle 29 while the disc 43 is secured to the end of the pipe 28. The disc 43 is held rotatingly in the nozzle by means of a gasket 49 and a nut 50 which is screwed into an internal thread in the rear of the nozzle. From this construction it will be seen that the nozzle may be turned on the disc 43. It will also be seen, from reference to Figs. 9 and 10, that, by turning the disc 43 in relation to the disc 46, the openings 44 and 45 may be changed in relation to the arcuated orifices 47 and 48. The reason for this will be explained later. So as to ascertain the position of the nozzle in relation to the disc 43, a ball 51, actuated by a spring 52, is preferably employed. This ball engages in notches 53 and 54 formed on the inside of the nozzle, as illustrated in Fig. 9. The nozzle is provided with an ordinary orifice 55 in the front end.

The device operates in the following manner. The water enters the chamber 20 and flows through the valve opening 22, after which it enters the chamber 21 and, when the nozzle 29 is closed, exerts its pressure against the piston 17 in the large cylinder 13. This pressure tends to drive the plunger 18 forward and thus presses the cartridge 27 against the screen 33. As the water presses against the piston 17, the by-pass 15, as well as the chamber 24 and the pipe 28, will fill with water.

If the nozzle is now opened by moving the disc 46 so that the orifices 44 and 45 align with the arcuated openings 47 and 48, the water will flow through the by-pass 15 and consequently through the nozzle. When passing through the chamber 24 the water will also flow through the passage 31, chamber 30 and passage 32. In flowing through this chamber the water will dissolve the outside end of the cartridge 27 which is squeezed against, or through, the screen and thus thoroughly mix the contents of the cartridge with the water.

As the water flows through the orifices 44 and 45 it is divided into two streams which are deflected by the arcuated openings 47 and 48. These streams are giving a twirling action by the arcuated openings as the water enters the chamber 56 in the nozzle and before it is expelled from the orifice 55. This twirling or rotary motion of the water assures that any undissolved particles from the cartridge, which may be carried with the water, is thoroughly dissolved and mixed with the water before it is discharged from the orifice in the nozzle. By turning the discs 46 and 43 in relation to each other, the openings 44 and 45 may be varied in their location to the arcuated slots. Thus, by placing them in the position shown in Fig. 10, the stream through the arcuated openings will be as indicated by the line 57, while this angle may be made more or less obtuse by rotating the plate 46.

As the end of the cartridge is slowly dissolved the plunger advances until the whole cartridge is used up. When this takes place a small amount of water will flow between the walls of the cylinder 14 and the outside of the plunger 18 and be discharged from an orifice 58 formed in the filler 16. Thus, water coming out through this orifice will indicate that the cartridge has been used up and that another one must be inserted. It will, of course, be understood that as long as any of the cartridge is left in the cylinder 14, the cartridge itself will seal the slight opening between the plunger and the cylinder and thus prevent the water from working back to the orifice 58.

While I have spoken of insecticides and germicides as being dissolved in the base of which the cartridge 27 is made, chemicals, used for other purposes, may be employed. It will also be understood that the cartridge may be made of various consistencies so that it will be dissolved more or less rapidly by the water, or even be squeezed through the screen. In like manner the screen may be made with openings of various sizes to suit the particular cartridge employed.

From the foregoing it will be seen that this device is extremely simple in its operation and effects a perfect mixture of the spraying material and that it may be used for any purpose where spraying devices are required. It will further be noticed that the flow of water, as well as the flow of the mixture may be regulated by the valve 23 as well as by a suitable valve controlling the water pressure which operates the device.

Having described the invention and its objects, what I claim as new and wish to protect by Letters Patent is:

1. A spraying device of the class described comprising a rear header having means for connecting it to a source of water supply, a front header, a stepped cylinder connected between said headers and having its large end connected to the rear header and its small end to the front header, a piston operatively engaged in the large end of the cylinder and extending into the small end thereof, a screen secured over the end of the small cylinder, a soluble cartridge contained in the small cylinder and adapted to be pressed against the screen by water pressure exerted against the piston, a by-pass leading from the rear header to the front header for carrying water over the screen to dissolve and mix with the part of the cartridge exposed through said screen as the cartridge is fed forward by the action of the piston, and a nozzle for discharging the solution from the device.

2. A spraying device of the class described comprising a rear header having means for connecting it to a source of water supply, a front header, a stepped cylinder connected between said headers and having its large end connected to the rear header and its small end to the front header, a piston operatively engaged in the large end of the cylinder and extending into the small end thereof, a screen secured over the end of the small cylinder, a soluble cartridge contained in the small cylinder and adapted to be pressed against the screen by water pressure exerted against the piston, a by-pass leading from the rear header to the front header for carrying water over the screen to dissolve and mix with the part of the cartridge exposed through said screen as the cartridge is fed forward by the action of the piston, a nozzle for discharging the solution from the device, and means for intimately mixing the solution as it passes through the nozzle.

3. A spraying device of the class described comprising a rear header having means for connecting it to a source of water supply, a front header, a stepped cylinder connected between said headers and having its large end connected to the rear header and its small end to the front header, a piston operatively engaged in the large end of the cylinder and extending into the small end thereof, a screen secured over the end of the small cylinder, a soluble cartridge contained in the small cylinder and adapted to be pressed against the screen by water pressure exerted against the piston, a by-pass leading from the rear header to the front header for carrying water over the screen to dissolve and mix with the part of the cartridge exposed through said screen as the cartridge is fed forward by the action of the piston, a nozzle for discharging the solution from the device, and means for varying the amount of the solution passing through the device.

4. A spraying device of the class described comprising a rear header having means for connecting it to a source of water supply, a front header, a stepped cylinder connected between said headers and having its large end connected to the rear header and its small end to the front header, a piston operatively engaged in the large end of the cylinder and extending into the small end thereof, a screen secured over the end of the small cylinder, a soluble cartridge contained in the small cylinder and adapted to be pressed against the screen by water pressure exerted against the piston, a by-pass leading from the rear header to the front header for carrying water over the screen to dissolve and mix with the part of the cartridge exposed through said screen as the cartridge is fed forward by the action of the piston, a nozzle for discharging the solution from the device, and the screen being interchangeable so as to vary the strength of the solution.

5. A spraying device of the class described comprising a rear header having means for connecting it to a source of water supply, a front header, a stepped cylinder connected between said headers and having its large end connected to the rear header and its small end to the front header, a piston operatively engaged in the large end of the cylinder and extending into the small end thereof, a screen secured over the end of the small cylinder, a soluble cartridge contained in the small cylinder and adapted to be pressed against the screen by water pressure exerted against the piston, a by-pass leading from the rear header to the front header for carrying water over the screen to dissolve and mix with the part of the cartridge exposed through said screen as the cartridge is fed forward by the action of the piston, a nozzle for discharging the solution from the device, and the consistency of the cartridge determining the strength of the solution.

6. A spraying device of the class described comprising a rear header having means for connecting it to a source of water supply, a front header, a stepped cylinder connected between said headers and having its large end connected to the rear header and its small end to the front header, the small cylinder made of hexagonal cross-section, a piston operatively engaged in the large end of the cylinder and extending into the small end thereof, a screen secured over the end of the small cylinder, the small cylinder adapted to hold a soluble cartridge pressed against the screen by water pressure exerted against the piston, a by-pass leading from the rear header to the front header for carrying water over the screen to dissolve and mix with that part of the cartridge which is exposed through said screen when the cartridge is inserted in the cylinder and fed forward by the action of the piston, a nozzle for discharging the solution from the device, and means for indicating when the cartridge has been completely dissolved.

WILLIAM A. ROEHM.